(12) United States Patent
Shimada et al.

(10) Patent No.: US 6,519,419 B2
(45) Date of Patent: Feb. 11, 2003

(54) METHOD OF CONTROLLING POWER SOURCE OF CAMERA

(75) Inventors: Noboru Shimada, Saitama (JP); Katsuji Ozawa, Saitama (JP); Takao Umetsu, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/916,278

(22) Filed: Jul. 30, 2001

(65) Prior Publication Data

US 2002/0025160 A1 Feb. 28, 2002

(30) Foreign Application Priority Data

Jul. 28, 2000 (JP) ........................................ 2000-228268

(51) Int. Cl.$^7$ ................................................ G03B 7/26
(52) U.S. Cl. ...................... 396/277; 396/287; 396/301
(58) Field of Search ............................... 396/277–279, 396/287, 303, 301, 302

(56) References Cited

U.S. PATENT DOCUMENTS 5,032,864 A * 7/1991 Ishimura et al. ............ 396/302

FOREIGN PATENT DOCUMENTS

| JP | 05-281600 | 10/1993 | ........... G03B/17/00 |
| JP | 11-038465 | 2/1999 | ............ G03B/7/26 |

* cited by examiner

Primary Examiner—W. B. Perkey
(74) Attorney, Agent, or Firm—Young & Thompson

(57) ABSTRACT

In a camera having an LCD and a clock device, a power source consists of a battery and a booster circuit. When a power switch button is pressed, the camera moves to an ON mode including a drive mode and a standby mode. In the drive mode, the booster circuit is continuously turned on to supply voltage of a predetermined high level. In the standby mode, the booster circuit is intermittently turned on to output voltage of between the predetermined high level and a minimum display voltage level that is necessary for the LCD to keep its display density in a proper range. The booster circuit is normally turned off in an OFF mode. But if the battery voltage goes below a reset level below which a clock device of the camera cannot work, the booster circuit is intermittently turned on in the OFF mode, to boost the battery voltage up above the reset level and drive the clock device by the output voltage of the booster circuit.

12 Claims, 8 Drawing Sheets

METHOD OF CONTROLLING POWER SOURCE OF CAMERA

BACKGROUND OF THE INVENTION

1. Field of the Invention

The present invention relates a method of controlling a power source of a camera, wherein the power source consists of at least a battery and a booster circuit for boosting a battery voltage up to a predetermined level, and supplies the voltage to respective elements of the camera.

2. Background Arts

Many of recent cameras have electronic mechanisms and devices mounted therein, such as an automatic focusing device, an automatic exposure control device, a motor-driven zooming mechanism, and an electronic shutter. In these cameras, a microcomputer is used for controlling the electronic elements sequentially. Also, a display device, mostly an LCD (liquid crystal display) panel, is often integrated in the camera, for displaying information necessary for photography, like whether a photo filmstrip is loaded or not, the film speed, the number of photographed picture frames or the remaining number of available exposures, the present date and time that is to be superimposed on each picture frame, the present camera mode, the charge condition of power source batteries, and so forth.

As the power source batteries, the cameras generally use a lithium cell, like CR123A, or an AA-type battery, whose voltage is about 3V. To obtain a higher operating voltage, e.g. 5V, enough for the microcomputer and other electric elements to operate, the power source voltage from the battery is boosted up through a booster circuit when a main switch of the camera is turned on to switch the camera from an OFF mode to an ON mode for enabling photographic operations. In those cameras where the microcomputer should operate during the OFF mode, e.g. for operating the clock, or for monitoring the switching condition of the main switch, the microcomputer can operate at the battery voltage.

Because the camera consumes a lot of current while the booster circuit is active, the battery will run down soon if the booster circuit is kept active throughout the ON mode. To avoid such inconvenience, most of the commercially available cameras have a function to deactivate the booster circuit and turn off the power source automatically when the camera has not been operated for a predetermined time while it is set in the ON mode. This function will be called an auto-off function. The auto-off function suppresses the waste of battery, to make the battery last for a longer time.

Indeed the auto-off function deactivates the booster circuit after the camera stays in its standby condition for a certain time, but it does not reduce the consumption of the battery during the standby condition. Accordingly, in order to save the consumption of the electric power effectively, the booster circuit should be turned off as soon as possible while the camera is in the standby condition. However, if the booster circuit is turned off frequently, the operation facility of the camera gets worse.

Japanese Laid-open Patent Application No. 11-38465 discloses another teaching for saving the consumption of electric power, wherein a booster circuit is not activated but a low speed CPU operates at the low battery voltage during the standby condition. The low speed CPU is for operating the clock and monitoring switching condition of a release switch that is turned on by a shutter release operation. Upon the shutter release operation or upon any other operation on the camera, the booster circuit is activated, to boost the battery voltage up to the operating voltage necessary for operating a high speed CPU. The high speed CPU is for controlling sequential operations and data processing. Since the booster circuit does not operate during the standby condition, the power consumption is suppressed, and the battery lasts longer.

However, the latter prior art also has problems. The battery voltage fluctuates largely when a large current flows through the battery, for example, when the respective elements of the camera are activated at once in response to the release switch being turned on, or when a flash circuit is activated. Such a large voltage fluctuation may cause to reset the low speed CPU, putting the clock out of time, or disabling responding to the shutter release operation. Where the LCD is driven at the boosted voltage, the LCD does not display the photographic information in the standby condition, i.e., unless the booster circuit is activated upon some operation on the camera.

Since the LCD may be driven either at the battery voltage of about 3V, or at the boosted voltage of about 5V, it is possible to supply the LCD with the battery voltage while the booster circuit is inactive, and with the operating voltage after the booster circuit gets active. It is also possible to use the battery voltage for driving the LCD without boosting it.

However, as the LCD has a property to vary its display density according to the supplied voltage, the difference between the battery voltage and the boosted voltage results in changing the display density of the LCD so much that the LCD can be mistaken as defective. In addition, if the operating voltage of the LCD is adjusted to one of these two different voltage levels, the performances of the LCD could be remarkably worsened at the other voltage level. On the other hand, where the LCD is always supplied with the battery voltage, the display density varies largely when the battery voltage fluctuates largely each time the respective elements of the camera are concurrently activated in response to the shutter release operation or another operation on the camera.

Furthermore, where the microcomputer functions as the clock for showing the present date and time or dating the photographed pictures, if the battery voltage goes below a lower limit of the operating voltage for the microcomputer in the OFF mode where the booster circuit is off, the clock not only stops clocking, but the date and time of the clock will be initialized. In that case, it is necessary to setup the date and time of the clock again. To avoid such an inconvenience, the battery must be replaced with new one before the battery voltage goes below the lower limit of the operating voltage. This is a waste of the battery.

SUMMARY OF THE INVENTION

In view of the foregoing, an object of the present invention is to provide a method of controlling the power source, which is effective for saving the power consumption, while maintaining the LCD in a proper display condition even in the standby condition.

Another object of the present invention is to provide a method of controlling the power source, whereby the clock device of the camera can operate even while the battery voltage is very low, so the battery may be used in the camera as fully as possible.

According to an aspect of the present invention, in a method of controlling a power source of a camera that is provided with a display device, wherein the power source comprises a battery and a booster circuit for boosting a battery voltage up to a predetermined upper level, the booster circuit being turned on and off by a control device, the method comprises steps of:

turning the booster circuit on continuously while the camera is in a drive mode driving photographic mechanisms of the camera, to output voltage of the predetermined upper level continuously during the drive mode;

turning the booster circuit on intermittently at a regular time interval while the camera is in a standby mode waiting for any external operation on the camera, such that the output voltage of the booster circuit varies between the predetermined upper level and a predetermined lower level during the standby mode; and driving at least the display device by the output voltage of the booster circuit continuously during the drive mode and the standby mode.

Since the booster circuit is intermittently turned on and off during the standby mode, the power consumption is reduced.

By setting the predetermined lower level to be a minimum voltage level necessary for the display device to keep its display density above a predetermined level, the display density is maintained in a satisfactory range during the standby mode, while saving the power consumption.

According to another aspect of the present invention, in a method of controlling a power source of a camera that is provided with a clock device for counting time, wherein the power source comprises a battery and a booster circuit for boosting a battery voltage up to a predetermined upper level, the booster circuit being turned on and off by a control device, the method comprises steps of:

turning the booster circuit on continuously while the camera is in a drive mode driving photographic mechanisms of the camera, to output voltage of the predetermined upper level to necessary portions of the camera;

checking, as the camera moves to an OFF mode where the camera is prohibited from photographing, if the battery voltage is above a reset level below which the clock device of the camera cannot work;

turning the booster circuit off and driving the clock device by the battery voltage during the OFF mode, if the battery voltage is above the reset level; and turning the booster circuit on intermittently at a regular time interval during the OFF mode, if the battery voltage is below the reset level, to boost the battery voltage up above the reset level and drive the clock device by the output voltage of the booster circuit during the OFF mode.

According to this configuration, if the battery voltage goes below the reset level, the battery voltage is boosted up above the reset level of the clock device to drive the clock device by the output voltage of the booster circuit even in the OFF mode. Therefore, the clock device can continue clocking for a certain period after the battery voltage goes below the reset level.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
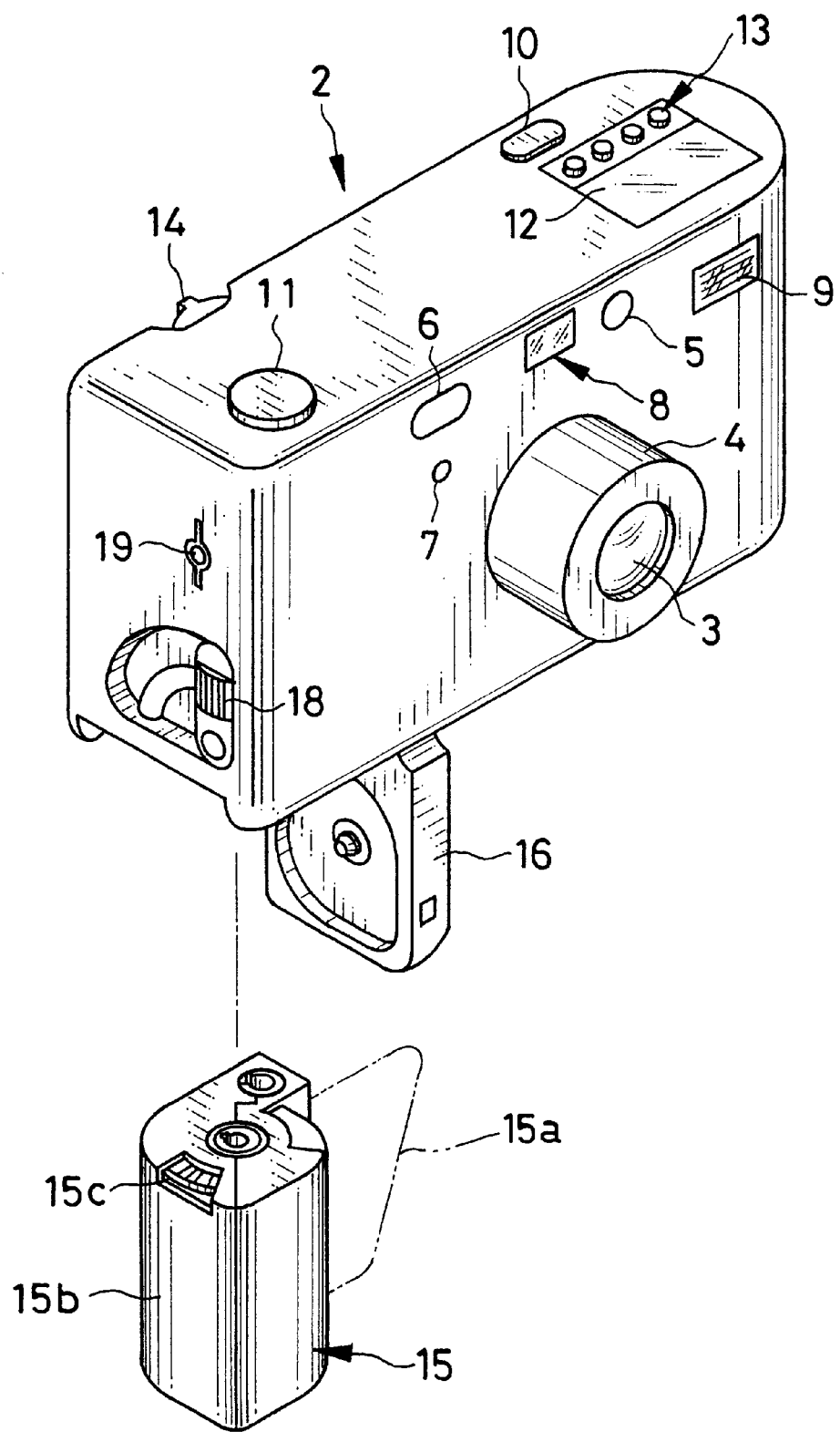
FIG. 1 is a perspective view of a camera according to an embodiment of present invention.

In the camera shown in FIG. 1, a camera body 2 has a lens barrel 4 holding a taking lens 3, a light projecting window 5, a light receiving window 6, a photometric window 7, a finder objective window 8 and a flash projector 9 on a front side thereof. There are a power switch button 10, a release button 11, an LCD panel 12 and a control panel 13 on a top side of the camera body 2, and a zoom lever 14 is provided on an upper rear side portion of the camera body 2.

Figure 2:
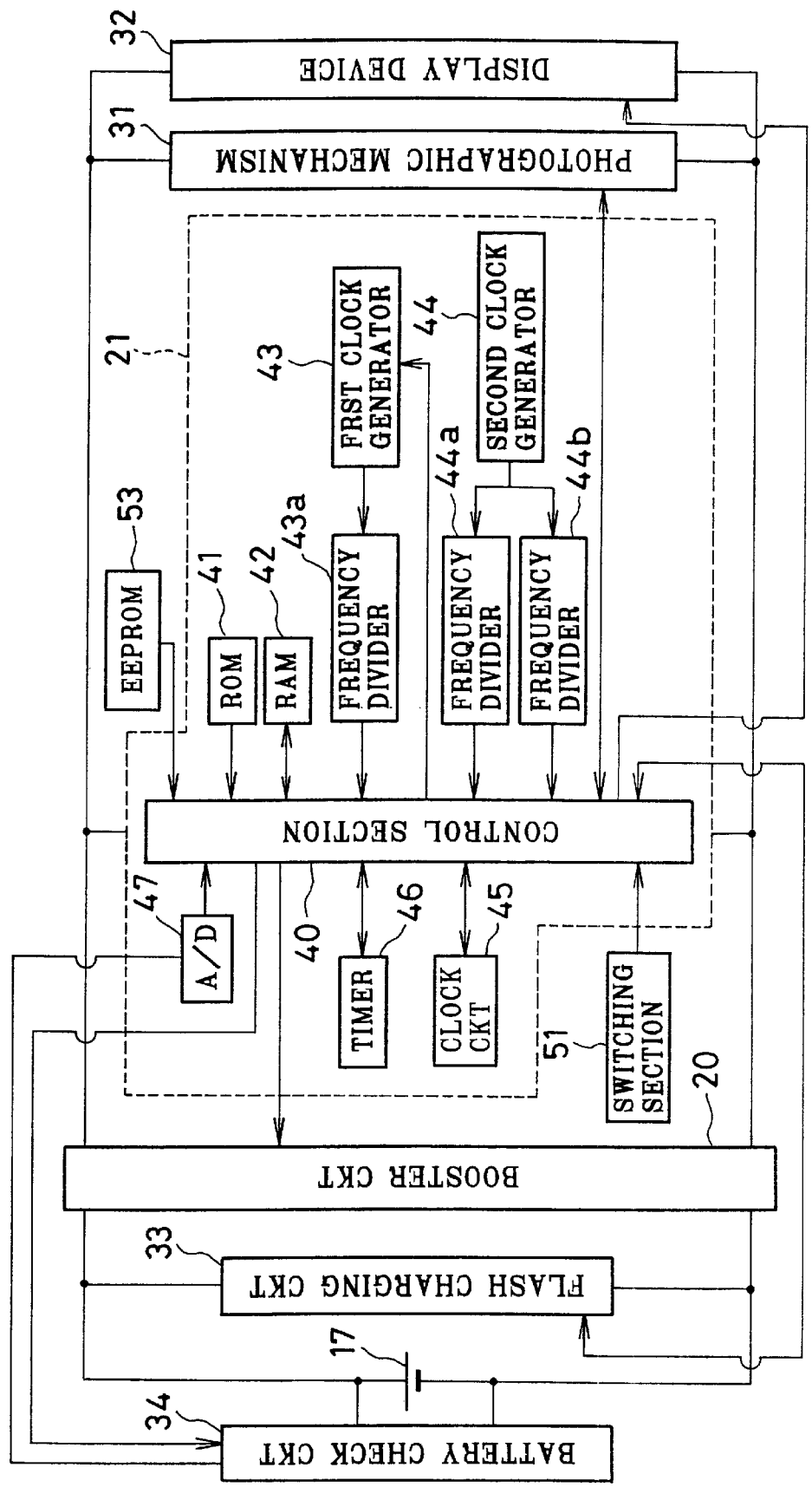
FIG. 2 is a block diagram illustrating a circuitry of the camera of FIG. 1.

On a bottom side of the camera body 2 are provided a cartridge chamber lid 16 of a not-shown cartridge chamber for loading a photo film cartridge 15, and a not-shown lid of a not-shown battery chamber for loading a battery 17 (see FIG. 2). Provided on one side of the camera body 2 are a lever 18 that is operated for opening or closing the cartridge chamber lid 16 and a MRC (mid-roll change) button 19 that is operated for rewinding a filmstrip 15a into a cartridge shell 15b at any appropriate time even when the filmstrip 15a has some frames unexposed.

In this instance, the battery 17 is a lithium battery whose nominal voltage is 3.0V, e.g. CR123 or CR2. Photographic mechanisms, including a shutter mechanism and a zooming mechanism, and the LCD 12 are driven at a voltage that is obtained by boosting a battery voltage $V_{BTT}$ of the battery 17 through a booster circuit 20 (see FIG. 2).

Figure 3:
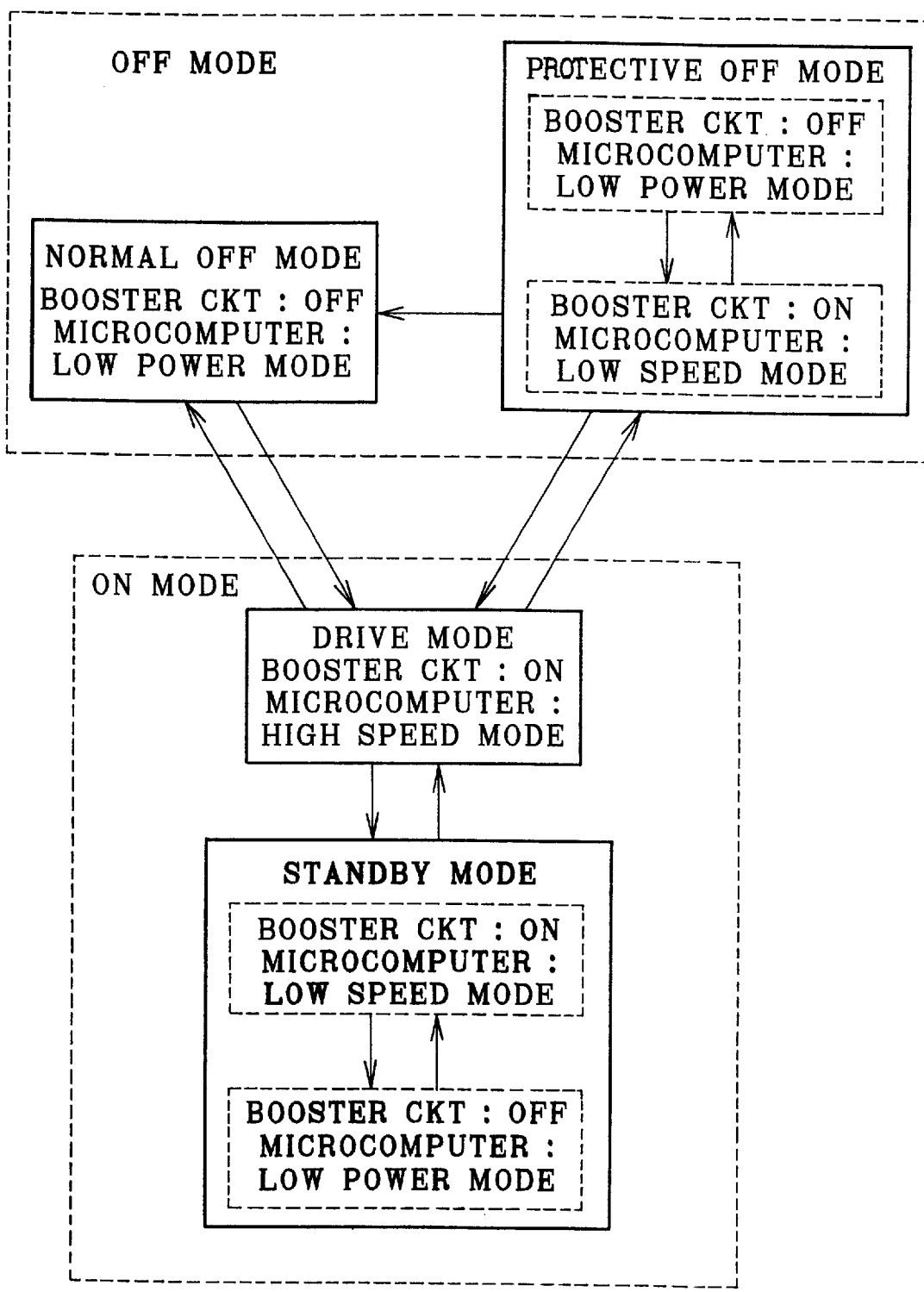
FIG. 3 is a conceptual block diagram illustrating operation modes of the camera.

Each time the power switch button 10 is operated, the camera is alternately switched over between an OFF mode where the photography is prohibited, and an ON mode where the photography is permitted. As shown in FIG. 3, the OFF mode is further grated into a normal OFF mode and a protective OFF mode. The normal OFF mode is selected when the battery voltage $V_{BTT}$ is above a predetermined level, whereas the protective OFF mode is selected when the battery voltage $V_{BTT}$ goes below the predetermined level. On the other hand, the ON mode is further grated into a drive mode and a standby mode. In the drive mode, the booster circuit 20 is kept in an ON position for making ready for photography and accomplishing photography. In the standby mode, the booster circuit 20 is turned ON and OFF for saving the battery 17 while waiting for an action on the camera.

As shown in FIG. 2, a microcomputer 21 controls overall operations of the camera. The microcomputer 21 has three operation modes: a high speed mode for high-speed controlling and processing, a low speed mode using a lower operation clock frequency for saving power consumption in comparison with the high-speed mode, and a low power mode where the operation voltage as well as the operation clock frequency is lowered to cut down the power consumption to the minimum. In the high speed mode, for instance, the microcomputer 21 operates at an operation voltage of 5V and an operation clock frequency of 500 kHz. In the low speed mode, the microcomputer 21 operates at the operation voltage of 5V and an operation clock frequency of 16 kHz. In the low power mode, the microcomputer 21 operates at an operation voltage that is higher than a reset voltage of the microcomputer 21, e.g. 2.3V, below which the microcomputer 21 cannot operates, and the operation clock frequency of 16 kHz. It is to be noted that the microcomputer 21 can operate in the high speed mode or the low speed mode even while the operation voltage varies a little from 5V.

Figure 4:
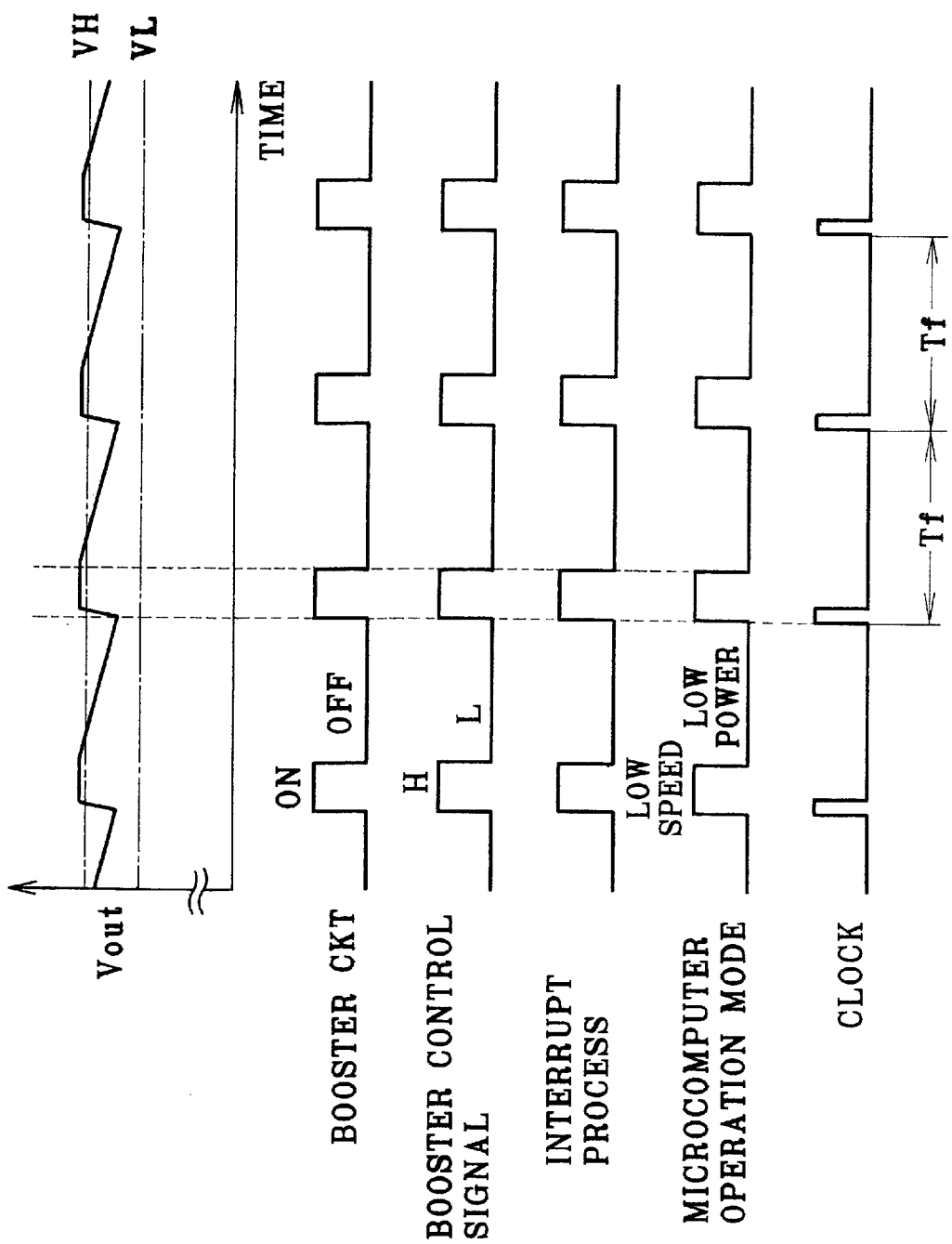
FIG. 4 is a timing chart showing an output voltage of a booster circuit in relation to signals generated in the camera.

In the drive mode, the booster circuit 20 is kept ON and the microcomputer 21 is set to the high speed mode. In the standby mode, the booster circuit 20 is intermittently turned ON at a regular time interval Tf, as shown in FIG. 4. The microcomputer 21 is set to the low speed mode while the booster circuit 20 is ON, and to the low power mode while the booster circuit 20 is OFF.

In the normal OFF mode, the booster circuit 20 is kept OFF and the microcomputer 21 is set to the low power mode. In the protective OFF mode, the booster circuit 20 is turned ON and OFF in the same way as in the standby mode, in order to prevent resetting the microcomputer 21. This is for maintaining the operation voltage above a requisite level for driving the microcomputer 21 and thus preventing the clock of the microcomputer 21 from being reset, while saving the consumption of the battery 17.

Immediately after the camera is switched from the OFF mode to the ON mode in response to the power switch button 10 being operated, the camera is once set to the drive mode, for initializing the respective sections of the camera and preparing for the photography, like protruding the lens barrel 4 to a photography position as shown in FIG. 1. Thereafter, the camera moves to the standby mode.

In the standby mode, the microcomputer 21 monitors operations on the power switch button 10, the release button 11, the zoom lever 14, the control panel 13, the cartridge chamber lid 16 and the MRC button 19. If any operation is done on one of these portions, the camera moves to the drive mode, and the microcomputer 21 makes appropriate controls and processing. Also in the drive mode, the microcomputer 21 monitors operations on the power switch button 10, the release button 11, the zoom lever 14, the control panel 13, the cartridge chamber lid 16 and the MRC button 19, and makes appropriate processing and controls.

For example, when the release button 11 is pressed halfway in the ON mode, the microcomputer 21 measures a subject distance and a subject brightness through the light-projecting and receiving windows 5 and 6 and the photometric window 7 in the drive mode. When the release button 11 is pressed further to the full, the taking lens 3 is focused in accordance with the measured subject distance, and the shutter mechanism is driven in accordance with the measured subject brightness. After an exposure is made in this way, the filmstrip 15a is advanced by one frame, and then the camera returns to the standby mode. When the zoom lever 14 is operated in the ON mode, the lens barrel 4 is moved to adjust the taking lens 3 accordingly in the drive mode.

When the power switch button 10 is operated in the ON mode, the microcomputer 21 makes a series of termination processes, like retracting the lens barrel 4 into a rest position, and thereafter the camera moves to the OFF mode. Also when any of the release button 11, the zoom lever 14, the control panel 13 and the MRC button 19 have not been operated for a constant auto-off time $T_{OFF}$, e.g. 7 minutes, the camera is automatically switched to the OFF mode.

When moving to the OFF mode, the battery voltage $V_{BTT}$ of the battery 17 is checked to select either the normal OFF mode or the protect mode depending upon the level of the battery voltage $V_{BTT}$. That is, if the battery voltage $V_{BTT}$ is above the reset voltage, i.e. the requisite minimum operation voltage for the microcomputer 21, the camera moves to the normal OFF mode. Otherwise, the camera moves to the protective OFF mode. In the protective OFF mode, the battery voltage $V_{BTT}$ is checked at appropriate timings $T_{BTT}$, so the camera moves to the normal OFF mode when the battery voltage $V_{BTT}$ becomes more than the reset voltage.

In the OFF mode, the microcomputer 21 monitors operations on the power switch button 10, the cartridge chamber lid 16 and the MRC button 19. When the cartridge chamber lid 16 or the MRC button 19 is operated, the camera moves to the drive mode to make predetermined processes, and then returns to the OFF mode.

The LCD 12 is turned on during the ON mode, to display information on the photography, such as the remaining number of available exposures, the voltage level of the battery 17, the present date and/or time and what kind of flash mode is selected at present. For example, when the battery voltage $V_{BTT}$ goes below the reset voltage, an indicia for indicating the residual power of the battery 17 begins to wink.

The cartridge chamber lid 16 is opened up by turning the lever 18 to an unlock position as shown in FIG. 1. By closing the cartridge chamber lid 16, the lever 18 is automatically turned to a lock position, and locks the cartridge chamber lid 16 in the closed position.

The photo film cartridge 15 is of an IX 240 type for the Advanced Photo System. While the photo film cartridge 15 is unused or unloaded from the camera, the filmstrip 15a of this type is entirely located inside the cartridge shell 15b and a door member closes a film port in a light-tight fashion. The filmstrip 15a may be advanced out of the cartridge shell 15b by rotating a spool of the cartridge shell 15b in an unwinding direction. The cartridge shell 15b is provided with a data disc 15c that rotates together with the spool and has bar codes thereon, representative of film data, such as film speed, film type, and the available number of exposures.

The filmstrip 15a is formed with a transparent magnetic recording layer on a base side opposite to an emulsion side. A section of the magnetic recording layer is used as a data track for recording frame data of each picture frame by a magnetic head of the camera. The frame data may include data as to whether an artificial flash light is used or not, the date of photography, and whether the date of photography is to be printed with the frame or not.

When the photo film cartridge 15 is loaded and the cartridge chamber lid 16 is closed, specific mechanisms of the camera opens the door member and then rotates the spool in a winding direction. While the spool is rotated, the film data is readout from the bar code on the data disc 15c. In addition, prior to starting rotating the spool, an angular position of the data disc 15c is detected as an indicia for the condition of the filmstrip 15a: unexposed, partly exposed, fully exposed or developed. If the filmstrip 15a is determined to be unexposed or partly exposed, the spool is driven to rotate in the unwinding direction, to advance a leading end of the filmstrip 15a out of the cartridge shell 15b.

The leading end of the filmstrip 15a is wound around a take-up spool of the camera, to advance the filmstrip 15a by one frame at a time after each exposure. After the filmstrip 15a is exposed to the last frame, the filmstrip 15a is advanced further toward the take up spool for recording the magnetic data along the last frame, and thereafter the spool of the cartridge shell 15b is rotated in the winding direction to rewind the filmstrip 15a entirely into the cartridge shell 15b.

When the MRC button 19 is pressed in the ON mode or the OFF mode, the entire filmstrip 15a is rewind into the cartridge shell 15b, so that the photo film cartridge 15 may be unloaded from the camera even before all the available exposures are done on the filmstrip 15a.

As shown in FIG. 2, the booster circuit 20 is in the ON position while a booster control signal applied from the microcomputer 21 takes a high level, and boosts the battery voltage $V_{BTT}$ up to a constant level VH, 5V in this instance, and outputs an output voltage Vout of the boosted level VH.

Figure 5:
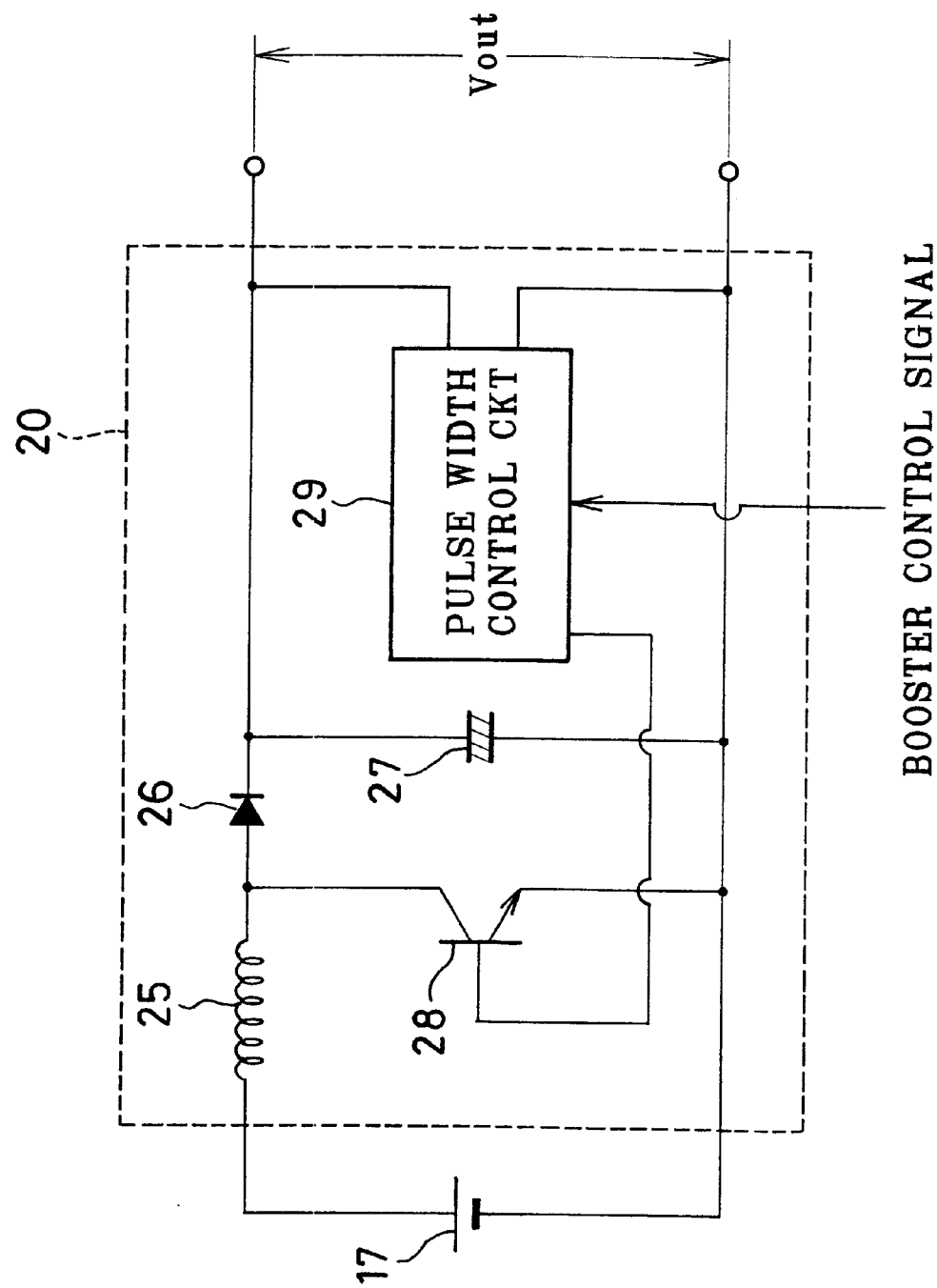
FIG. 5 is a circuit diagram of the booster circuit.

FIG. 5 shows an example of the booster circuit 20 in detail. The booster circuit 20 is constituted of a choke coil 25, a diode 26, a smoothing capacitor 27, a transistor 28, and a pulse width control circuit 29. That is, the booster circuit 20 constitutes a switching regulator of a pulse width control type. The pulse width control circuit 29 receives the booster control signal from the microcomputer 21, and generates a drive pulse signal while the booster control signal takes the high level. The drive pulse signal turns the transistor 28 cyclically on and off.

As the transistor 28 is turned on and off, the choke coil operates to boost up the voltage, and the boosted voltage is smoothed through the smoothing capacitor 27. The pulse width control circuit 29 monitors the output voltage Vout of the microcomputer 21, to control the duty factor of the drive pulse signal in accordance with the output voltage Vout, so that the battery voltage $V_{BTT}$ is boosted up to the constant level VH while the booster control signal is in the high level and the booster circuit 20 is ON, even if the battery voltage $V_{BTT}$ is lowered to a certain extent. When the booster control signal takes a low level and the booster circuit 20 is turned off, the smoothing capacitor 27 discharges, so the output voltage Vout goes down and finally reaches the same level as the battery voltage $V_{BTT}$.

The booster circuit 20 may be configured in a different way from that shown in FIG. 5, insofar as the output voltage gradually decreases after the booster circuit is turned off.

Since the booster circuit 20 is kept ON in the drive mode, the output voltage Vout of the booster circuit 20 is at the constant level VH. Since the booster circuit 20 is kept OFF in the normal OFF mode, the output voltage Vout is equal to the battery voltage $V_{BTT}$.

In the standby mode and the protective OFF mode, the microcomputer 21 turns the booster circuit 20 on and off at the regular time interval Tf. Therefore, the output voltage Vout is in the constant level VH while the booster circuit 20 is ON, and decreases from the constant level VH while the booster circuit 20 is OFF, and surges up to the constant level VH upon the booster circuit 20 being turned ON. The time interval Tf is determined such that the output voltage Vout will not go below a minimum display voltage VL necessary for maintaining the LCD 12 in a proper display density range.

In this way, consumption of the battery 17 is reduced while maintaining the display density of the LCD 12 in the proper range in the standby mode. In the protective OFF mode, the operation voltage necessary for the microcomputer 21 is maintained while reducing consumption of the battery 17.

As shown in FIG. 2, the output voltage Vout from the booster circuit 20 is supplied to the respective sections of the camera, such as the microcomputer 21, the photographic mechanisms 31, a display section 32 consisting of the LCD 12 and an LCD driver. The photographic mechanisms 31 includes a lens barrel moving device for the lens barrel 4, a focusing and zooming device for the taking lens 3, a film conveying device for conveying the filmstrip 15a back and forth, The shutter device, a photometric sensor, a range finding sensor, the magnetic head and a head driver for the magnetic head. The photographic mechanisms 31 can operate at the boosted voltage level VH.

The display section 32 receives display data from the microcomputer 21 in the ON mode, to display the information. The LCD 12 operates at the output voltage Vout in the ON mode. That is, the LCD 12 operates at the boosted voltage level VH in the drive mode, or at the voltage level varying from the boosted level VH to the minimum display voltage VL. Since the LCD 12 changes its display density with it operation voltage, too large difference between the minimum display voltage VL and the boosted voltage level VH results in a conspicuous difference in the display density, which can be mistaken as a defect. To avoid this problem, the minimum display voltage VL is determined such that the density reduction at the minimum display voltage VL relative to the display density at the boosted voltage level VH is not more than 20%.

As set forth above, the time interval Tf is determined such that the output voltage Vout will not be less than the minimum display voltage VL. The output voltage Vout decreases at a rate that varies depending upon how much load is applied to the booster circuit 20 while the booster circuit 20 is OFF. Therefore, in a case where the load on the booster circuit 20 in the OFF position may vary, the time interval Tf should be determined with respect to the maximum load, that is, with respect to the highest decreasing rate.

In this embodiment, the minimum display voltage VL is 4.5V, and the time interval Tf is 250 milliseconds. In addition, the clock signal of the microcomputer 21 is generated at the same time interval Tf. Therefore, the booster circuit 20 is turned on concurrently with the timing when the microcomputer 21 makes an interrupt process for clocking the date and time. It is alternatively possible to use a different time interval for clocking the date and time from the time interval Tf.

A flash charging circuit 33 is connected directly to the battery 17. The microcomputer 21 outputs a charge control signal to the flash charging circuit 33 at an appropriate time interval, e.g. at every 1 minute, in the standby mode. Upon the charge control signal, the flash charging circuit 33 boosts the battery voltage $V_{BTT}$ Up to a charging voltage, e.g. 300V, to charge a main capacitor of a flash device with this charging voltage. When the voltage across the main capacitor reaches a predetermined level, the flash charging circuit 33 automatically stops charging, and outputs a charge completion signal to the microcomputer 21. Besides the predetermined time interval, the charge control signal is sent to the flash charging circuit 33 at other necessary timings, e.g. when the power source is turned on, when the release button 11 is pressed, or when a photograph is taken.

A battery check circuit 34 is also connected to the battery 17. For example, the battery check circuit 34 consists of a voltage divider and a switching element connected between the voltage divider and the battery 17. When to check the battery 17, the microcomputer 21 outputs a check signal to the battery check circuit 34, and the switching element is turned on to divide the battery voltage $V_{BTT}$ through the voltage divider, so the battery check circuit 34 outputs a detection voltage representative of the residual voltage or capacity of the battery 17. The detection voltage is sent to the microcomputer 21, for use in determining the level of the battery voltage $V_{BTT}$ and the residual power of the battery 17.

The battery check is carried out at appropriate timings, e.g., when the camera is switched from the ON mode to the OFF mode, or when the mode is switched over between the standby mode and the drive mode. If the battery voltage $V_{BTT}$ is determined to be less than the reset level of the microcomputer 21 by the battery check executed at the switching from the ON mode to the OFF mode, the camera is set to the protective OFF mode. In the protective OFF mode, the level of the battery voltage $V_{BTT}$ is checked periodically till the battery voltage $V_{BTT}$ becomes above the reset voltage. During the battery check, the microcomputer 21 is set to the low speed mode, and the booster circuit 20 is set to the ON mode.

A not-shown backup capacitor is connected to the booster circuit 20, so that the booster circuit 20 may operate for a backup time, e.g. 10 seconds, even after the battery 17 is removed from the camera. Thus, the clock of the camera is not initialized if only the battery 17 is replaced with a new one within the backup time.

The microcomputer 21 is constituted of a control section 40 including a CPU and an interface for allowing the CPU to communicate with other devices, a ROM 41, a RAM 42, first and second clock generators 43 and 44, a clock circuit 45, a timer 46, an A/D converter 47, and other minor not show elements. As described above, the microcomputer 21 operates at the high speed mode, the low speed mode or the low power mode.

A switching section 51 is constituted of a number of switches that cooperate with the power switch button 10, the release button 11, the control panel 13, the zoom lever 14, the cartridge chamber lid 16 and the MRC button 19, and outputs operation signals to the control section 40 in accordance with the switching conditions of these switches. The control section 40 executes corresponding operations to the operation signals.

The ROM 41 stores sequential programs for the control section 40 to control the respective portions of the camera. The RAM 42 is used as a work memory that temporarily stores necessary data for controlling and processing.

The first clock generator 43 is activated in the high speed mode and the low speed mode, to generate a clock signal whose frequency is 4 MHz. As generating the relatively high frequency clock signal, the first clock signal generate 43 needs the operation voltage of about 5V, so the microcomputer 21 needs the operation voltage of 5V in the high speed mode and the low speed mode, and the booster circuit 20 must be ON in these modes. The clock signal from the first clock generator 43 is set to a frequency divider 43a, that divides the 4 MHz clock signal to output a 500 kHz operation clock signal to the control section 40. In the high speed mode, the control section 40 operates at the clock frequency of 500 kHz.

The second clock generator 44 is activated continuously to generate a 32 kHz clock signal, so long as the operation voltage supplied to the microcomputer 21 is more than the reset voltage level, regardless of the operation mode of the microcomputer 21. The 32 kHz clock signal from the second clock generator 44 is sent to a couple of frequency dividers 44a and 44b. One frequency divider 44a divides the 32 kHz clock signal to output a 16 kHz operation clock signal to the control section 40. The control section 40 operates at the clock frequency of 16 kHz in the low speed mode and the low power mode.

The other frequency divider 44b divides the 32 kHz clock signal to produce a 4 Hz clock signal, i.e. the clock signal whose pulse interval is 250 milliseconds and is used for clocking the date and time. The 4 Hz clock signal is also sent to the control section 40. Independently of whether the camera is in the ON mode or the OFF mode, the control section 40 makes the interrupt process for clocking the date and time at the interval of 250 milliseconds, i.e., in response to the 4 Hz clock signal. In the standby mode and the protective OFF mode, the booster circuit 20 is intermittently turned on in response to the 4 Hz clock signal.

The clock circuit 45 may be operated by the control panel 13, to set up "year","month","day" "hour" and "minute". Each time the control section 40 outputs an increment signal to the clock circuit 45 at the interval of 250 milliseconds during the interrupt process, the clock circuit 45 increments the time by ¼ seconds. Thereby, the clock circuit 45 clocks the present date and time. In the ON mode, the control section 40 reads out the present date and time counted by the clock circuit 45, and sends it to the display section 32, to make the LCD 12 displays the present date and/or the present time. However, when the photographer designates a print mode where the date or the time of photography is not printed together with the photographed picture, the present date or time is not displayed on the LCD 12.

The timer 46 operates both in the ON mode and the protective OFF mode, and counts up its value Tt by ¼ seconds in response to the count-up signal from the control section 40, in the same way as the clock circuit 45. The timer count Tt of the timer 46 is reset to "0" each time the control section 40 accepts any operation signal, or when the camera is switched from the ON mode to the protective OFF mode, or when the battery checking is done in the protective OFF mode.

When the control section 40 detects that the timer count Tt reaches the auto-off time $T_{OFF}$, i.e. 7 minutes in this instance, during the standby mode, the control section 40 causes the camera to move to the OFF mode. That is, if any operation has not been made on the camera for 7 minutes in the ON mode, the camera automatically moves to the OFF mode.

The control section 40 also outputs the charge control signal to the flash charging circuit 33 when the timer count Tt indicates charge control timings $T_{STB}$: 1 minute, 2 minutes, 3 minutes, 4 minutes, 5 minutes and 6 minutes. Thereby the flash charging circuit 33 makes charging operation every minute in the standby mode.

Furthermore, the control section 40 checks the battery 17 in the protective OFF mode when the timer count Tt corresponds to the predetermined battery check timing $T_{BTT}$. For example, the battery 17 is determined to be checked in 10 seconds after the camera moves to the protective OFF mode, and again in 7 minutes. The predetermined values for the battery check timing $T_{BTT}$ are stored in an EEPROM 53, and are adjustable according to the need. But the battery check timings $T_{BTT}$ may be fixed, and stored in the ROM 41. As described above, the control section 40 checks if the battery voltage $V_{BTT}$ is below the reset voltage level. If so, the control section 40 leaves the camera in the protective OFF mode. If it is detected that the battery voltage $V_{BTT}$ is above the reset voltage level, the control section 40 switches the camera to the normal OFF mode.

It is to be noted that the RAM 42 may be used for clocking the present date and time or counting the auto-off time $T_{OFF}$ and other timings $T_{STB}$ and $T_{BTT}$, instead of the clock circuit 45 and the timer 46.

The A/D converter 47 converts the detection voltage from the battery check circuit 34 into a digital form, and sends it to the control section 40. The control section 40 determines the level of the battery voltage $V_{BTT}$ and the residual power of the battery 17 on the basis of the digital detection signal.

According to the present embodiment, the control section 40 constitutes a control device for controlling ON and OFF of the booster circuit 20, and the control section 40, the second clock generator 44, the divider 44b and the clock circuit 45 constitute a clocking device.

Now the operation of the above described embodiment will be described.

Where the battery 17 is loaded and the battery voltage $V_{BTT}$ from the battery 17 is above the reset voltage level, the control section 40 is supplied with the 16 kHz operation clock signal and the 4 Hz clock signal, regardless of whether the camera is in the ON mode or the OFF mode, which clock signals are produced by dividing the clock signal from the second clock generator 44 through the frequency dividers 44a and 44b respectively. In response to the 4 Hz clock signal, the control section 40 makes the interrupt process even while the control section 40 is executing another process, to send the count-up signal at least to the clock circuit 45, so the clock circuit 45 counts up by ¼ seconds per one count-up signal.

While the camera is not used for photography, the camera is switched to the OFF mode by operating the power switch button 10. In the normal OFF mode, the booster circuit 20 is kept OFF, and the microcomputer 21 operates in the low power mode, i.e., at the low operation voltage that is equal to the battery voltage $V_{BTT}$, and with the 16 kHz operation clock. In the OFF mode, the control section 40 continuously monitors operations on the power switch button 10, the cartridge chamber lid 16, the MRC button through the switching section 51, including the period of executing the interrupt process.

When any of the power switch button 10, the cartridge chamber lid 16 and the MRC button 19 is operated in the OFF mode, the camera moves to the drive mode. For instance, when the cartridge chamber lid 16 is opened and then closed to load the photo film cartridge 20, a corresponding operation signal is fed to the control section 40. Upon this operation signal, the control section 40 first turns on the booster circuit 20 to output the output voltage Vout having the boosted voltage level VH. Then, the control section 40 activates the first clock generator 43, to make the microcomputer 21 operates in the high speed mode. After the camera moves to the drive mode in this way, the control section 40 drives the film conveying device of the photographic mechanisms 31, to advance the filmstrip 15a. If, on the contrary, the MRC button 19 is pressed in the OFF mode, the camera also moves to the drive mode, and rewinds the filmstrip 15a into the cartridge shell 15b.

At the conclusion of any operations in the driving mode, the camera returns to the OFF mode after checking the battery voltage $V_{BTT}$. If the battery voltage $V_{BTT}$ is above the reset voltage level at that time, the camera is set to the normal OFF mode. If not, the camera is set to the protective OFF mode.

Figure 6:
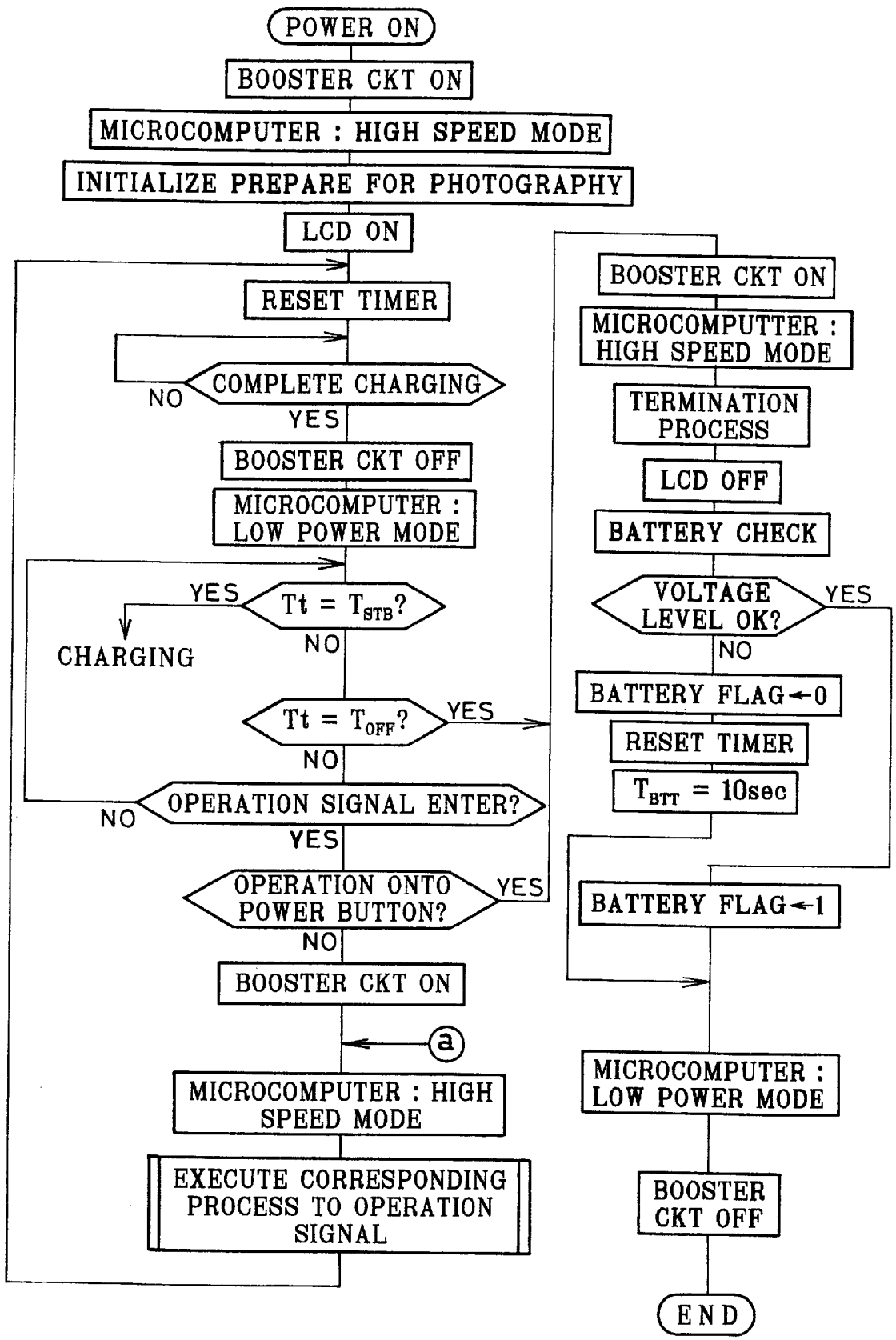
FIG. 6 is a flow chart illustrating an operation sequence in an ON mode of the camera.

To take a photograph, the power switch button 10 is pressed in the OFF mode to switch the camera to the ON mode. Specifically, when the control section 40 detects an operation signal representative of the operation on the power switch button 10, the control section 40 turns on the booster circuit 20 and sets the microcomputer 21 to the high speed mode, as shown in FIG. 6. That is, the camera is switched to the drive mode. Thereafter, the control section 40 lets the flash charging circuit 33 charge the main capacitor, the battery check circuit 34 check the battery 17, and the lens barrel 4 protrude to the photography position, and reads out the film data from the RAM 42.

After the camera is initialized and prepared for the photography in this way, the display device 32 is driven to turn on the LCD 12. Then, the LCD 12 displays the information on the residual power of the battery 17, the remaining number of available exposures, the present date and time under the control of the control section 40. Since the boosted voltage VH is applied to the display device 32, the display density of the LCD 12 is maintained at the optimum value.

After the LCD 12 is turned on, the control section 40 resets the timer 46. Thereafter when the charge completion signal is output from the flash charging circuit 33, the control section 40 switches the microcomputer 21 to the low power mode, and turns off the booster circuit 20, thereby setting the camera to the standby mode.

Figure 7:
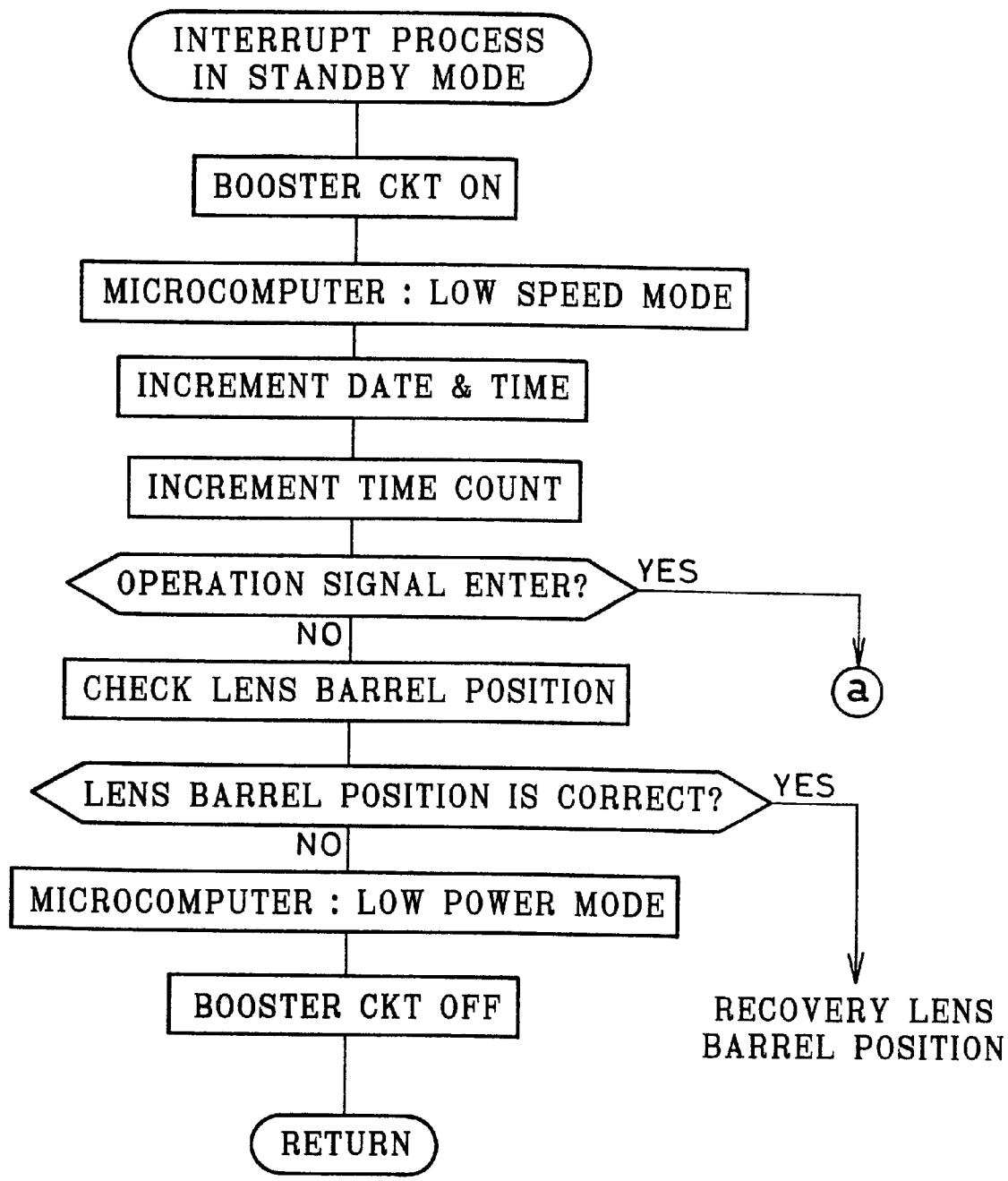
FIG. 7 is a flow chart illustrating a sequence of an interrupt process in a standby mode of the camera.
Figure 8:
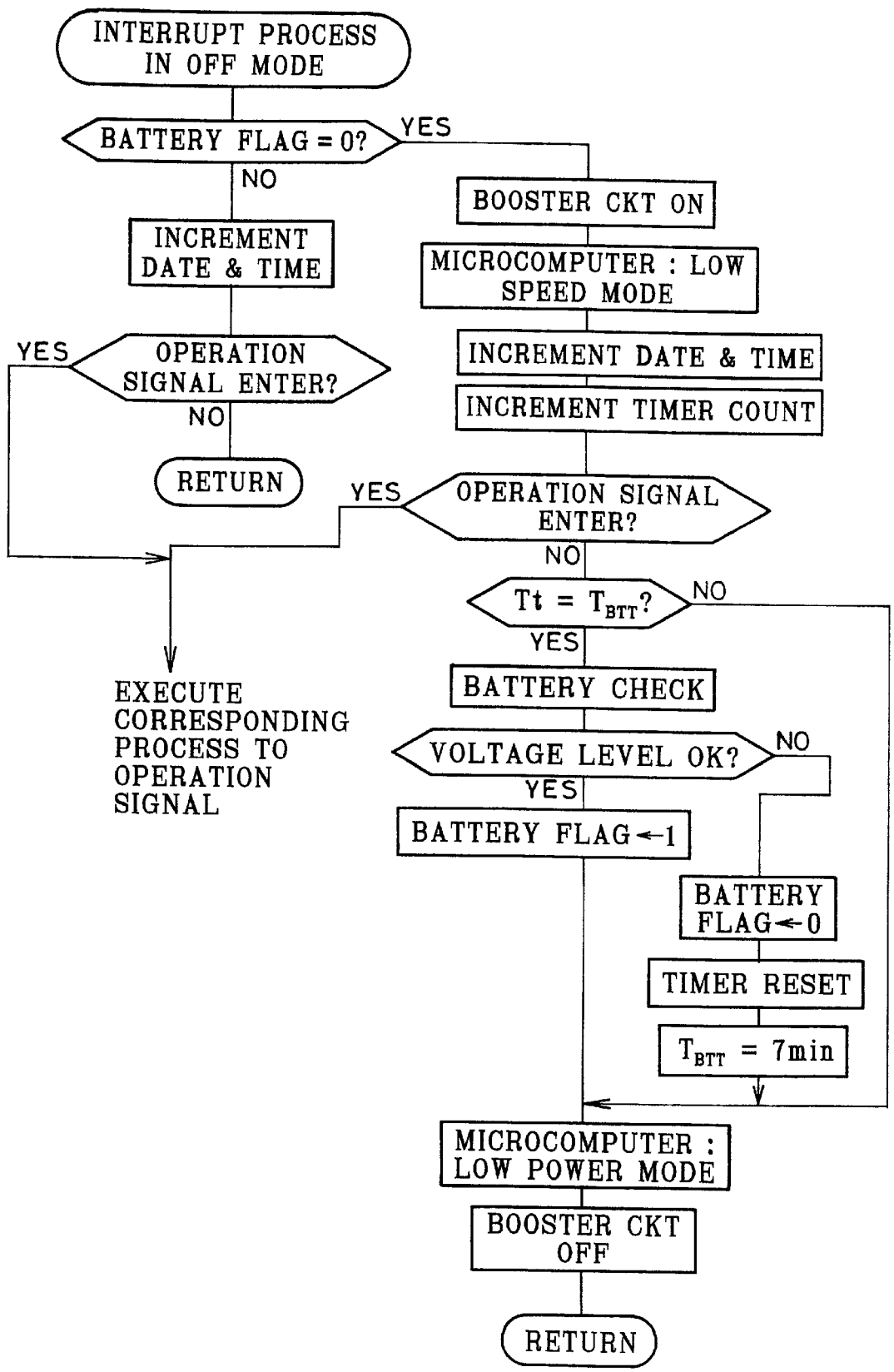
FIG. 8 is a flow chart illustrating a sequence of an interrupt process in an OFF mode of the camera.

In the standby mode, the control section 40 periodically compares the timer count Tt to the auto-off time $T_{OFF}$, to the charge control timings $T_{STB}$, and checks if there is any operation signal entered through the switching section 51. This operation may be called a waiting process. Also during the standby mode, the interrupt process is carried out upon each entrance of the 4 Hz clock signal. That is, within 250 milliseconds from the switching to the standby mode, the 4 Hz clock signal enters the control section 40, and the control section 40 carries out the interrupt process in the way as shown in FIG. 7.

In the interruption process during the standby mode, the control section 40 first sets the booster control signal to the high level, for keeping the output voltage Vout above the minimum display voltage VL. Responsive to the booster control signal taking the high level, the booster circuit 20 is turned on, so the transistor 28 is periodically turned on and off to boost the output voltage Vout up to the voltage level VH, i.e. 5V in this instance.

Thereafter, the control section 40 sets the microcomputer 21 to the low speed mode, and then sends the count-up signal to the clock circuit 45 and the timer 46, for incrementing the date and time and the timer count Tt by ¼ seconds.

Thereafter, the control section 40 checks if there is any operation signal from the switching section 51, and also checks the position of the lens barrel 4. If the position of the lens barrel 4 accords to the operation signal, the control section 40 sets the microcomputer 21 to the low power mode, and the booster control signal to the low level, concluding the interrupt process in the stand by mode. Then the control section 40 returns to the waiting process in the standby mode.

As the booster control signal takes the low level, the booster circuit 20 is turned off, so the smoothing capacitor 27 discharges, decreasing the level of the output voltage Vout. Upon receipt of the 4 Hz clock signal after the control section 40 returns to the waiting process, the control section 40 makes the interrupt process again in the same way as described above, and turns on the booster circuit 20 to boost the output voltage Vout up to the high voltage level VH. The booster circuit 20 is turned off at the conclusion of the interrupt process, so the output voltage Vout begins to decrease. In this way, the interrupt process is executed at the interval Tf of 250 milliseconds in the standby mode, and the booster circuit 20 is turned on only during the interrupt process. That is, as shown in FIG. 1, the booster circuit 20 is periodically turned on and off at the interval Tf of 250 milliseconds in the standby mode, so the output voltage Vout varies in the range from the boosted voltage level VH to the minimum display voltage level VL.

Because of the intermittence of the driving period of the booster circuit 20, the power consumption is reduced in comparison with the case where the booster circuit 20 is driven continuously. Since the output voltage Vout is maintained in the proper range above the minimum display voltage level VL, the display density of the LCD 12 is does not conspicuously vary.

If any operation signal is entered during the interrupt process, the control section 40 sets the microcomputer 21 to the high speed mode while keeping the booster circuit 20 in the ON position, so the camera moves to the drive mode, and makes a corresponding operation to the entered operation signal. After accomplishing the corresponding operation, the control section 40 resets the timer count Tt of the timer 46 to zero, and then returns to the waiting process of the standby mode. But if the entered operation signal is representative of the operation on the power switch button 10, the camera is switched from the ON mode to the OFF mode.

On the other hand, if the control section 40 determines that the position of the lens barrel 4 does not coincides with position data of the lens barrel 4 stored in the RAM 42 by the microcomputer 21, the camera is switched to the drive mode, for executing a recovery process for correcting the position of the lens barrel 4. After the completion of the recovery process, the camera returns to the waiting process of the standby mode. In that case, the timer 46 is not reset to zero.

Each time the timer count Tt comes to the charge control timings $T_{STB}$ in the standby mode the control section 40 switches the camera to the drive mode by turning on the booster circuit 20 and setting the microcomputer 21 to the high speed mode, and then outputs the charge control signal to activate the flash charging circuit 33 to charge the main capacitor.

When the main capacitor is charged up, and the flash charging circuit 33 outputs the charge-completion signal, the booster circuit 20 is turned off, and the microcomputer 21 is switched to the low power mode, thereby returning to the waiting process without resetting the timer 46, so the interrupt process is executed each time the control section 40 receives the 4 Hz clock, and the booster circuit 20 is turned on during the interrupt process. When the interrupt process should be executed during the charging process, the camera is kept in the drive mode while the count of the clock circuit 45 and the count of the timer 46 are incremented.

On the other hand, if the zoom lever 14 is operated during the waiting process or the interrupt process, the control section 40 switches the microcomputer 21 to the high speed mode and turns on the booster circuit 20 or maintains the booster circuit 20 in the ON position, thereby to set the camera to the drive mode. Thus, the taking lens 3 is enabled to zoom up and down in cooperation with the zoom lever 14.

Also when the release button 11 is pressed in the standby mode, the camera moves to the drive mode, measuring the subject distance and brightness. Thereafter when the release button 11 is pressed to the full, the taking lens 3 is focused in accordance with the measured subject distance, and the shutter mechanism is driven in accordance with the measured subject brightness. After an exposure is made in this way, the filmstrip 15a is advanced by one frame, and then the camera returns to the standby mode.

If the cartridge chamber lid 16 is opened and then closed, or the MRC button 19 is pressed, or the control panel 13 is operated, the camera is switched from the standby mode to the drive mode, making the necessary operations in the same way as described with respect to the OFF mode.

In this way, when any of the release button 11, the control panel 13, the zoom lever 14, the MRC button 19 and the cartridge chamber lid 16 is operated in the standby mode, the camera moves to the drive mode. After making the corresponding operations, the control section 40 activates the battery check circuit 34 to check the battery 17, resets the timer 46, and then revises the indicia indicating the residual power of the battery 17 on the LCD 12. Then, the camera returns to the standby mode.

When the power switch button 10 is pressed in the standby mode, the control section 40 sets the camera to the OFF mode. Also when the camera has been staying in the standby mode for 7 minutes, that is, when any operation has not been made on the camera and thus the timer counter Tt reaches the auto-off time $T_{OFF}$, the controller 40 sets the camera to the OFF mode.

Any time before the camera is switched to the OFF mode, the camera is once set to the drive mode to execute the terminating process, like retracting the lens barrel 4 to the reset position, and the LCD 12 is turned off. Thereafter the battery check circuit 34 is activated to check the battery 17. If the battery voltage $V_{BTT}$ is above the reset voltage level, the control section 40 set a battery flag "1", and then sets the microcomputer 21 to the low power mode, and turns the booster circuit 20 off, switching the camera to the OFF mode. If the battery voltage $V_{BTT}$ is below the reset voltage level, the control section 40 sets a battery flag "0", and then resets the count Tt of the timer 46 to zero, and sets a battery check interval $T_{BTT}$ at "10 seconds". Thereafter, the control section 40 sets the camera to the OFF mode.

In the interrupt process that is executed at the interval of 250 milliseconds in the OFF mode, the control section 40 first checks the battery flag. If the battery flag is "1", that is, when the battery voltage $V_{BTT}$ is above the reset voltage level, the date and time of the clock circuit 45 is incremented by ¼ seconds, and the operation signals are checked. Thereafter, the camera is set to the normal OFF mode. On the other hand, if the battery flag is "0", that is, when the battery voltage $V_{BTT}$ i s below the reset voltage level, the control section 40 executes the interrupt process in the protective OFF mode, wherein the booster circuit 20 is turned on, the microcomputer 21 is set to the low speed mode, the date and time of the clock circuit 45 and the count Tt of the timer 46 are incremented by ¼ seconds, the count Tt is compared to the battery check timing $T_{BTT}$, and the operat ion signals are checked. If the timer count Tt is equal to the battery check timing $T_{BTT}$, the battery checking circuit 34 is activated to check the battery 17, before terminating the interrupt process by setting the microcomputer 21 to the low power mode and turning off the booster circuit 20.

If the battery voltage $V_{BTT}$ is still below the reset voltage level, the battery flag is maintained "0", and the timer count Tt is reset to zero, and also the battery check timing $V_{BTT}$ is revised to 7 minutes. On the other hand, if the battery voltage $V_{BTT}$ is above the reset voltage level, the battery flag is set to "1", so the next interrupt process will be executed in the normal OFF mode.

Consequently, when the battery voltage is determined below the reset voltage level by the battery check, the camera is set to the protective OFF mode till it is determined by the following battery check that the battery voltage recovers the reset voltage level. In the protective OFF mode, the booster circuit 20 is periodically turned on and off in the same way as in the standby mode, that is the booster circuit 20 is turned on at the interval Tf, i.e. every 250 milliseconds in this instance. Thereby, even while the battery voltage $V_{BTT}$ is below the reset voltage level and thus the battery 17 is needed to be replaced with a new one, the microcomputer 21 is supplied at least with the minimum display voltage VL, so the clock circuit 45 may continue clocking the date and time.

While the battery voltage $V_{BTT}$ is below the reset voltage level, the indicia for indicating the residual power of the battery 17 on the LCD 12 winks. Then, the user of the camera should replace the battery 17 with a new one after setting the camera to the OFF mode. Even while the battery 17 is removed, the microcomputer 21 continues operating based on the voltage from the backup capacitor, so the clock circuit 45 continues clocking.

When the battery check process is executed after the new battery 17 is loaded, the battery voltage $V_{BTT}$ will be determined to be more than the reset voltage level, so the battery flag is set to "1". If, for example, the camera is in the OFF mode at that time, the camera is switched to the normal OFF mode, so the booster circuit 20 is maintained OFF. Thereafter, the microcomputer 21 operates in the low power mode at the battery voltage $V_{BTT}$, and lets the clock circuit 45 clock, while monitoring the operation signals entered through the MRC button 24 and other operation members.

As described above, since the operation voltage necessary for activating the microcomputer 21 is supplied to the microcomputer 21 even after the battery voltage $V_{BTT}$ goes below the reset voltage level, the battery 17 may be replaced with a new one after the battery voltage $V_{BTT}$ goes below the reset voltage level, without the need for setting up the date and time of the clock circuit 45 thereafter. Thus, the capacity of the battery 17 is utilized as fully as possible.

Although the present invention has been described with respect to the embodiment where the LCD is turned on in the OFF mode and the battery consumption is saved in the standby mode while maintaining the LCD at the proper display density, it is possible to turn on the LCD in the protective OFF mode, in order to indicate that the battery voltage is below the reset voltage level and the battery changing is needed. This is possible since the booster circuit 20 is periodically turned on and off in the protective OFF mode like in the standby mode.

The present invention is not only applicable to those cameras using photo film cartridges, but also to those using self-developing type instant photo film, or digital still cameras, video cameras, and the like.

Thus, the present invention is not to be limited to the above embodiment but, on the contrary, various modifications will be possible to those skilled in the art without departing from the scope of claims appended hereto.

What is claimed is:

1. A method of controlling a power source of a camera that is provided with a display device, wherein said power source comprises a battery and a booster circuit for boosting a battery voltage up to a predetermined upper level, said booster circuit being turned on and off by a control device, said method comprising steps of:

turning said booster circuit on continuously while said camera is in a drive mode driving photographic mechanisms of said camera, to output voltage of said predetermined upper level continuously during said drive mode;

turning said booster circuit on intermittently at a regular time interval while said camera is in a standby mode waiting for any external operation on said camera, such that the output voltage of said booster circuit varies between said predetermined upper level and a predetermined lower level during said standby mode; and driving at least said display device by the output voltage of said booster circuit continuously during said drive mode and said standby mode.

2. A method as recited in claim 1, wherein said predetermined lower level is a minimum voltage level necessary for said display device to keep its display density above a predetermined level.

3. A method as recited in claim 1, wherein said minimum voltage level is determined to make density reduction at said minimum display voltage level relative to a display density at said upper voltage level is not more than 20%.

4. A method as recited in claim 1, wherein said camera moves from said standby mode to said drive mode in response to the external operation on said camera.

5. A method as recited in claim 1, wherein said control device drives a clock device of said camera to clock at said regular time interval by one increment that corresponds to said regular time interval.

6. A method as recited in claim 5, further comprising steps of:

checking, as said camera moves to an OFF mode where said camera is prohibited from photographing, if the battery voltage is above a reset level below which said clock device of said camera cannot work;

turning said booster circuit off and driving said clock device by the battery voltage in said OFF mode, if the battery voltage is above said reset level; and turning said booster circuit on intermittently at said regular time interval during said OFF mode, if the battery voltage is below said reset level, to drive said clock device by the output voltage of said booster circuit in said OFF mode.

7. A method as recited in claim 6, further comprising a step of driving said display device by the output voltage of said booster circuit while said booster circuit is intermittently turned on and off in said OFF mode, to make said display device indicate that the battery voltage is below said reset level.

8. A method as recited in claim 6, wherein said control circuit operates based on a first operation clock signal of a high frequency during said drive mode, or based on a second operation clock signal of a low frequency during said standby mode and said OFF mode.

9. A method of controlling a power source of a camera that is provided with a clock device, wherein said power source comprises a battery and a booster circuit for boosting a battery voltage up to a predetermined upper level, said booster circuit being turned on and off by a control device, said method comprising steps of:

turning said booster circuit on continuously while said camera is in a drive mode driving photographic mechanisms of said camera, to output voltage of said predetermined upper level to necessary portions of said camera;

checking, as said camera moves to an OFF mode where said camera is prohibited from photographing, if the battery voltage is above a reset level below which said clock device of said camera cannot work;

turning said booster circuit off and driving said clock device by the battery voltage in said OFF mode, if the battery voltage is above said reset level; and turning said booster circuit on intermittently at a regular time interval during said OFF mode, if the battery voltage is below said reset level, to boost the battery voltage up above said reset level and drive said clock device by the output voltage of said booster circuit in said OFF mode.

10. A method as recited in claim 9, wherein said control device drives said clock device at said regular time interval to count up by one increment that corresponds to said regular time interval.

11. A method as recited in claim 9, wherein said control circuit operates based on a first operation clock signal of a high frequency during said drive mode, or based on a second operation clock signal of a low frequency during said OFF mode.

12. A method as recited in claim 9, further comprising steps of:

checking at predetermined timings after said camera moves to said OFF mode, if the battery voltage is above said reset level;

turning said booster circuit off and driving said clock device by the battery voltage, if the battery voltage is above said reset level in said OFF mode; and turning said booster circuit on intermittently at said regular time interval and driving said clock device by the output voltage of said booster circuit, if the battery voltage is below said reset level in said OFF mode.

* * * * *